(12) United States Patent
Otani et al.

(10) Patent No.: US 8,154,693 B2
(45) Date of Patent: Apr. 10, 2012

(54) LIQUID CRYSTAL DISPLAY DEVICE AND MANUFACTURING METHOD FOR SAME

(75) Inventors: Miharu Otani, Yokohama (JP); Jun Tanaka, Kawasaki (JP); Kazuhito Masuda, Hitachi (JP); Masaya Adachi, Hitachi (JP); Takato Hiratsuka, Mito (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 293 days.

(21) Appl. No.: 12/496,695

(22) Filed: Jul. 2, 2009

(65) Prior Publication Data
US 2010/0002173 A1    Jan. 7, 2010

(30) Foreign Application Priority Data
Jul. 4, 2008   (JP) ................................. 2008-175542

(51) Int. Cl.
G02F 1/1335    (2006.01)
(52) U.S. Cl. ........... 349/114; 349/96; 349/122; 349/187
(58) Field of Classification Search ............. 349/96, 349/113, 114, 122, 138, 187; 428/1.3, 1.31
See application file for complete search history.

(56) References Cited

U.S. PATENT DOCUMENTS

| | | | |
|---|---|---|---|
| 2006/0040069 A1* | 2/2006 | Lavretovich et al. | 428/1.2 |
| 2006/0082706 A1* | 4/2006 | Choo et al. | 349/114 |
| 2006/0125986 A1* | 6/2006 | Choo et al. | 349/114 |
| 2008/0088759 A1* | 4/2008 | Utsumi et al. | 349/42 |
| 2008/0143939 A1* | 6/2008 | Adachi et al. | 349/114 |
| 2009/0153781 A1* | 6/2009 | Otani et al. | 349/74 |

FOREIGN PATENT DOCUMENTS

| | | |
|---|---|---|
| JP | 08-511109 | 11/1996 |
| JP | 11-084430 | 3/1999 |
| JP | 2005-250430 | 9/2005 |
| JP | 2006-171723 | 6/2006 |
| JP | 2006-184325 | 7/2006 |
| JP | 2007-133294 | 5/2007 |
| JP | 2008-151817 | 7/2008 |

* cited by examiner

*Primary Examiner* — Dung Nguyen
*Assistant Examiner* — Tai Duong
(74) *Attorney, Agent, or Firm* — Antonelli, Terry, Stout & Kraus, LLP.

(57) ABSTRACT

An object of the present invention is to increase the dichroic ratio of the built-in polarizing layer in reflective regions so that the display performance improves in a semi-transmission type liquid crystal display device having a transmissive display portion and a reflective display portion. The present invention provides a liquid crystal display device having first and second substrates which face each other with a liquid crystal layer in between, where a transmissive region and a reflective region are formed in each pixel on the above described first substrate, as well as: a reflective layer formed in the above described reflective region on the above described first substrate; a polarizing layer formed on the above described first substrate on the liquid crystal layer side of the above described reflective layer from chromonic liquid crystal molecules; a pixel electrode formed on the above described first substrate on the liquid crystal layer side of the above described reflective layer and electrically connected to a source electrode of a thin film transistor; and a protective layer formed in the reflective region between the above described polarizing layer and the above described pixel electrode which makes contact with the above described polarizing layer.

7 Claims, 3 Drawing Sheets

LIQUID CRYSTAL DISPLAY DEVICE AND MANUFACTURING METHOD FOR SAME

The present application claims priority over Japanese application JP 2008-175542 filed on Jul. 4, 2008, the contents of which are hereby incorporated into this application by reference.

BACKGROUND OF THE INVENTION (1) Field of the Invention

The present invention relates to a liquid crystal display device, and in particular, to a semi-transmission type liquid crystal display device having a reflective display portion which also works as a transmissive display portion, as well as a manufacturing method for the same.

(2) Related Art Statement

Liquid crystal display devices have such advantages as to be thin and light, and consume little power in comparison with CRT's (cathode ray tubes), which are the mainstream for conventional display devices, and thus, have many applications as display devices, for various electronics. From among these, higher visibility has been required for display devices for portable information apparatuses in various environments, including dark places, such as indoors, places where there are no external light sources, and places with strong illumination, such as outdoors in fair weather, and thus, semi-transmission type liquid crystal display devices having a transmissive display portion and a reflective display portion within each pixel are widely used.

In semi-transmission type liquid crystal display devices, a backlight is used in transmissive display portions, so that the brightness is constant, irrespectively of the environment, and therefore, an appropriate display can be gained in relatively dark environments, such as indoors and in dark rooms. Meanwhile, reflective display portions provide a display through reflection of external light using a built-in reflective plate, and thus, the contrast is constant, irrespectively of the brightness outside, and therefore, an appropriate display can be gained in relatively bright environments, such as outdoors in fair weather, and indoors.

Meanwhile, IPS (in-plane switching) type liquid crystal display devices are conventional liquid crystal display devices, and known to have a wide view angle, and in the case where IPS types are applied to a semi-transmission type liquid crystal display devices, a problem arises, such that a dark display cannot be gained in reflective portions. In contrast, reflection type displays and transmission type displays are implemented when a polarizing layer is built in, as in the below described Patent Document 1.

In addition, the below described Patent Document 2 discloses a semi-transmission type liquid crystal display device of a twisted nematic (TN) type. In this semi-transmission type liquid crystal display device also, a polarizing layer is built-in, and thus, reflective display and transmission display are compatible.

In addition, the below described Patent Document 3 discloses transmission type and semi-transmission type liquid crystal display devices. These transmission type and semi-transmission type liquid crystal display devices have a built-in polarizer, and an interlayer insulating film is formed on top of the polarizing layer from a photosensitive resin, and thus, the image quality is better, the display device is compact, the yield in the manufacture is higher, the reliability high, and the process is simpler. Here, the built-in polarizing layers in the below described Patent Documents to 3 are formed by applying and curing an application liquid which includes the lyotropic liquid crystal described in the below Patent Document 4 as a polarizing material.

[Patent Document 1] Japanese Unexamined Patent Publication 2006-184325
[Patent Document 2] Japanese Unexamined Patent Publication 2006-171723
[Patent Document 3] Japanese Unexamined Patent Publication 2005-250430
[Patent Document 4] Japanese translation of International Unexamined Patent Publication H08 (1996)-511109

SUMMARY OF THE INVENTION

Problem to Be Solved by the Invention

Patent Document 3 describes that an interlayer insulating film is formed on top of a built-in polarizing layer (first polarizing layer) from a photosensitive resin, and that it is used to pattern the polarizing layer. In the case where it is patterned through immersion in an alkali developer, and a problem arises, such that the water soluble polarizing layer is eluted and side etched, and the interlayer insulating film lifts and peels. In addition, in the case where a polarizing layer is built-in, it may undergo a heating process when an interlayer insulating film is formed above the polarizing layer or the polarizing layer is patterned, and a problem arises, such that the dichroic ratio of the polarizing layer is low, as a result of the heating process for the polarizing layer.

In the built-in polarizing layer in semi-transmission type liquid crystal display devices, the greater the dichroic ratio is, the more the contrast ratio can be expected to increase, and therefore, higher quality is required for the polarizing film, and the quality must be prevented from deteriorating, in order for the image quality to increase. An object of the present invention is to provide a liquid crystal display device where the image quality is high and higher yield and reliability are possible in the manufacture, as well as a manufacturing method for the same.

Means for Solving Problem

In order to achieve the above described object, the present invention provides the following structures, for example.

That is to say, the first mode of the present invention provides a liquid crystal display device having first and second substrates which face each other with a liquid crystal layer in between, where a transmissive region and a reflective region are formed in each pixel on the above described first substrate, as well as: a reflective layer formed in the above described reflective region on the above described first substrate; a polarizing layer formed on the above described first substrate on the liquid crystal layer side of the above described reflective layer from chromonic liquid crystal molecules; a pixel electrode formed on the above described first substrate on the liquid crystal layer side of the above described reflective layer and electrically connected to a source electrode of a thin film transistor; and a protective layer formed in the reflective region between the above described polarizing layer and the above described pixel electrode which makes contact with the above described polarizing layer.

The second mode of the present invention provides a liquid crystal display device having first and second substrates which face each other with a liquid crystal layer in between, where a transmissive region and a reflective region are formed in each pixel on the above described first substrate, as well as: a reflective layer formed in the above described reflective region on the above described first substrate; a polarizing layer formed on the above described first substrate on the liquid crystal layer side of the above described reflective layer from chromonic liquid crystal molecules; a transmissive pixel electrode formed on the above described first substrate on the liquid crystal layer side of the above described reflective layer and electrically connected to a source electrode of the above described thin film transistor; a common electrode formed on the above described first substrate on the liquid crystal layer side of the above described polarizing layer between the above described polarizing layer and the above described pixel electrode with the above described pixel electrode and an insulating film in between; and a protective layer for protecting the above described polarizing layer formed in the reflective region between the above described polarizing layer and the above described pixel electrode which makes contact with the above described polarizing layer.

The above described protective layer in the liquid crystal display device is formed of a film having resistance to oxygen plasma.

In addition, the manufacturing method for a liquid crystal display device according to the present invention is a manufacturing method for a liquid crystal display device having a first and second substrate which face each other with a liquid crystal layer in between, where a transmissive region and a reflective region are formed in each pixel on the above described first substrate, and is provided with the steps of:

forming a reflective layer in aid reflective region on the above described first substrate; forming a polarizing layer on the above described first substrate on the above described liquid crystal layer side of the above described reflective layer; forming a pixel electrode which is electrically connected to a source electrode of a thin film transistor on the above described first substrate on the liquid crystal layer side of the above described polarizing layer; and forming a protective layer in the reflective region between the above described polarizing layer and the above described pixel electrode.

The above described manufacturing method for a liquid crystal display device is provided with the steps of: forming the above described protective layer from a film having resistance to oxygen plasma; and patterning the above described polarizing layer through a dry process using the above described protective layer as a mask.

In addition, the manufacturing method for a liquid crystal display device according to the present invention is a manufacturing method for a liquid crystal display device having a first and second substrate which face each other with a liquid crystal layer in between, where a transmissive region and a reflective region are formed in each pixel on the above described first substrate, and provided with the steps of: forming a reflective layer in the above described reflective region on the above described first substrate; forming a polarizing layer on the above described first substrate on the liquid crystal layer side of the above described reflective layer from chromonic liquid crystal molecules; forming a transmissive pixel electrode that is electrically connected to a source electrode of the above described thin film transistor on the above described first substrate on the liquid crystal layer side of the above described reflective layer; forming the above described pixel electrode, an insulating film and a transmissive common electrode in sequence so that the above described pixel electrode and the above described common electrode sandwich the insulating film, the above described pixel electrode is on the above described liquid crystal layer side of the above described common electrode, and the above described common electrode is on the above described liquid crystal layer side of the above described polarizing layer; and forming a protective layer for protective the above described polarizing layer in a reflective region between the above described polarizing layer and the above described pixel electrode, so that the protective layer makes contact with the above described polarizing layer.

The above described manufacturing method for a liquid crystal display device is provided with the steps of: forming the above described protective layer from a film having resistance to oxygen plasma; and patterning the above described polarizing layer through a dry process using the above described protective layer as a mask.

Effects of the Invention

In the liquid crystal display device according to the present invention, the protective film above the polarizing layer has a resistance to oxygen plasma and functions as a mask for patterning the polarizing layer through a dry process, and thus, the polarizing layer can be prevented from eluting. In addition, the orientation of the polarizing layer can be prevented from being disturbed due to thermal fluctuation, because of the hardness of the protective film in an upper layer, and thus, the dichroic ratio can be prevented from lowering, and high reliability and quality can be achieved.

Other effects of the present invention will become more clear from the descriptions throughout the entirety of the specification.

EXPLANATION OF SYMBOLS

Figure 1:
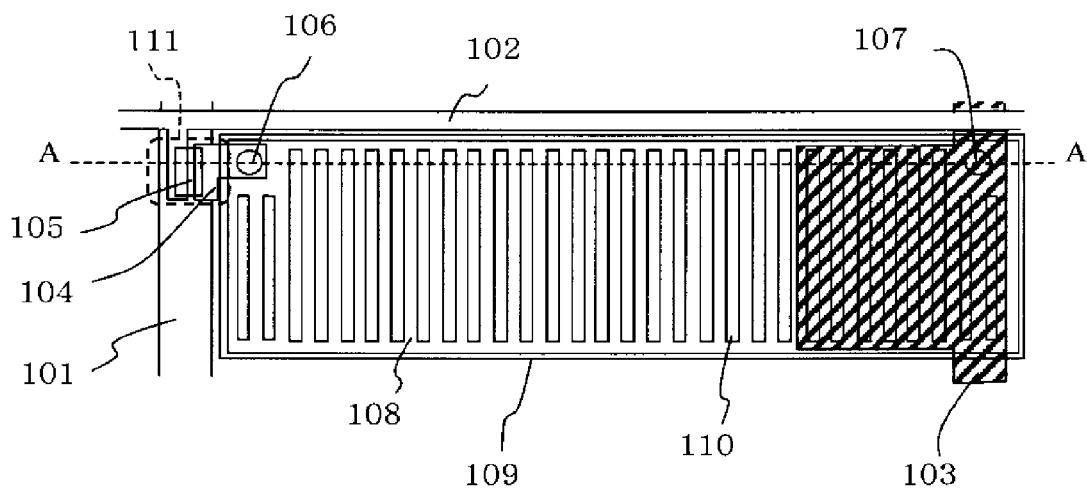
FIG. 1 is a plan diagram showing a pixel region in a liquid crystal display device according to the present invention.

101 . . . scan wire
102 . . . signal wire
103 . . . common wire
104 . . . input/output wire
105 . . . semiconductor layer
106 . . . second through hole
107 . . . first through hole
108 . . . pixel electrode
109 . . . common electrode
110 . . . opening in transparent conductive film
111 . . . thin film transistor
201 . . . first substrate
202 . . . base layer
203 . . . semiconductor layer
204 . . . gate insulating layer
205 . . . gate electrode
206 . . . interlayer insulating layer
207 . . . electrode layer
207a . . . source electrode
207b . . . drain electrode
208 . . . first insulating layer
209 . . . second insulating layer
210 . . . reflective layer 211 . . . flat layer
212 . . . polarizing layer
213 . . . protective layer
2014 . . . third insulating layer
215 . . . common electrode
216 . . . fourth insulating layer
217 . . . pixel electrode
218 . . . first through hole
219 . . . liquid crystal layer
220 . . . color filter layer
221 . . . second substrate
222 . . . outer polarizing plate
223 . . . outer polarizing plate
224 . . . second through hole
225 . . . protrusion
226 . . . orientation film
401 . . . gate line
402 . . . source line
403 . . . capacitor line
404 . . . TFT

DETAILED DESCRIPTION OF THE INVENTION

In the following, the embodiments of the present invention are described in reference to the drawings. In the following, the structure of liquid crystal display devices may be described using the manufacturing process. In addition, the same symbols are attached to components which are the same or similar in the drawings and the embodiments, and descriptions thereof are nor repeated.

First Embodiment

Figure 2:
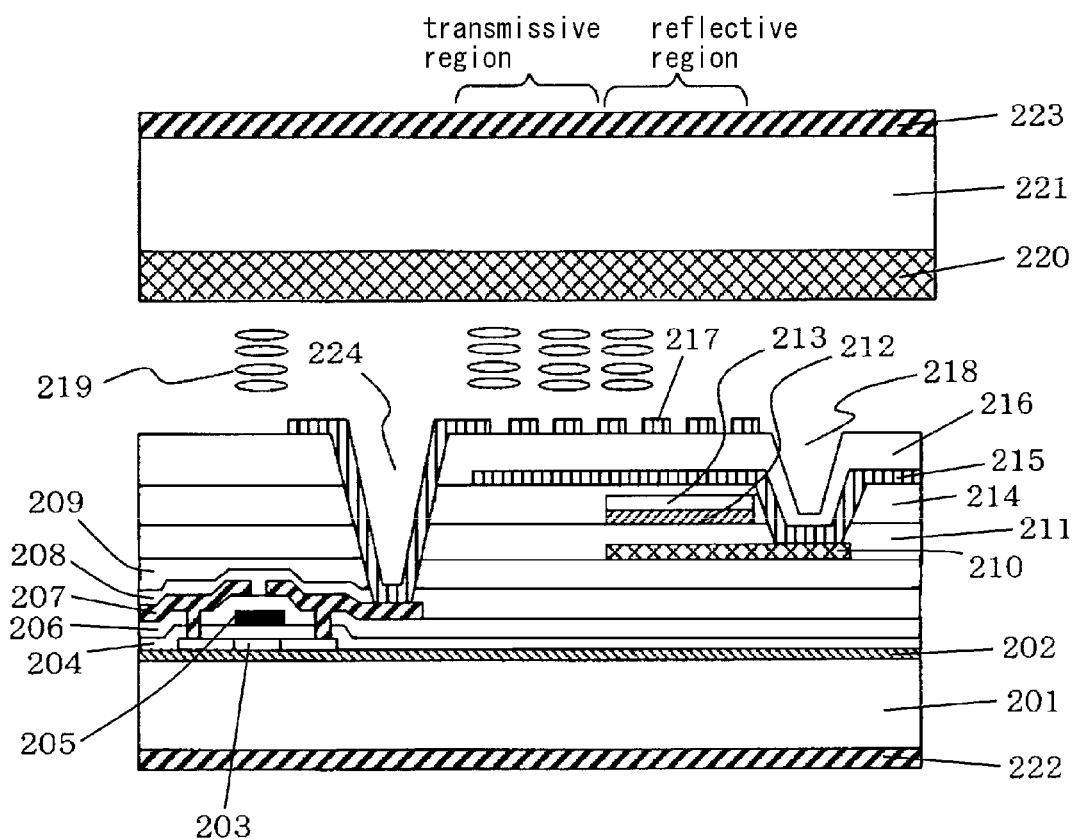
FIG. 2 is a cross sectional diagram showing a pixel region in a liquid crystal display device according to the present invention.
Figure 3:
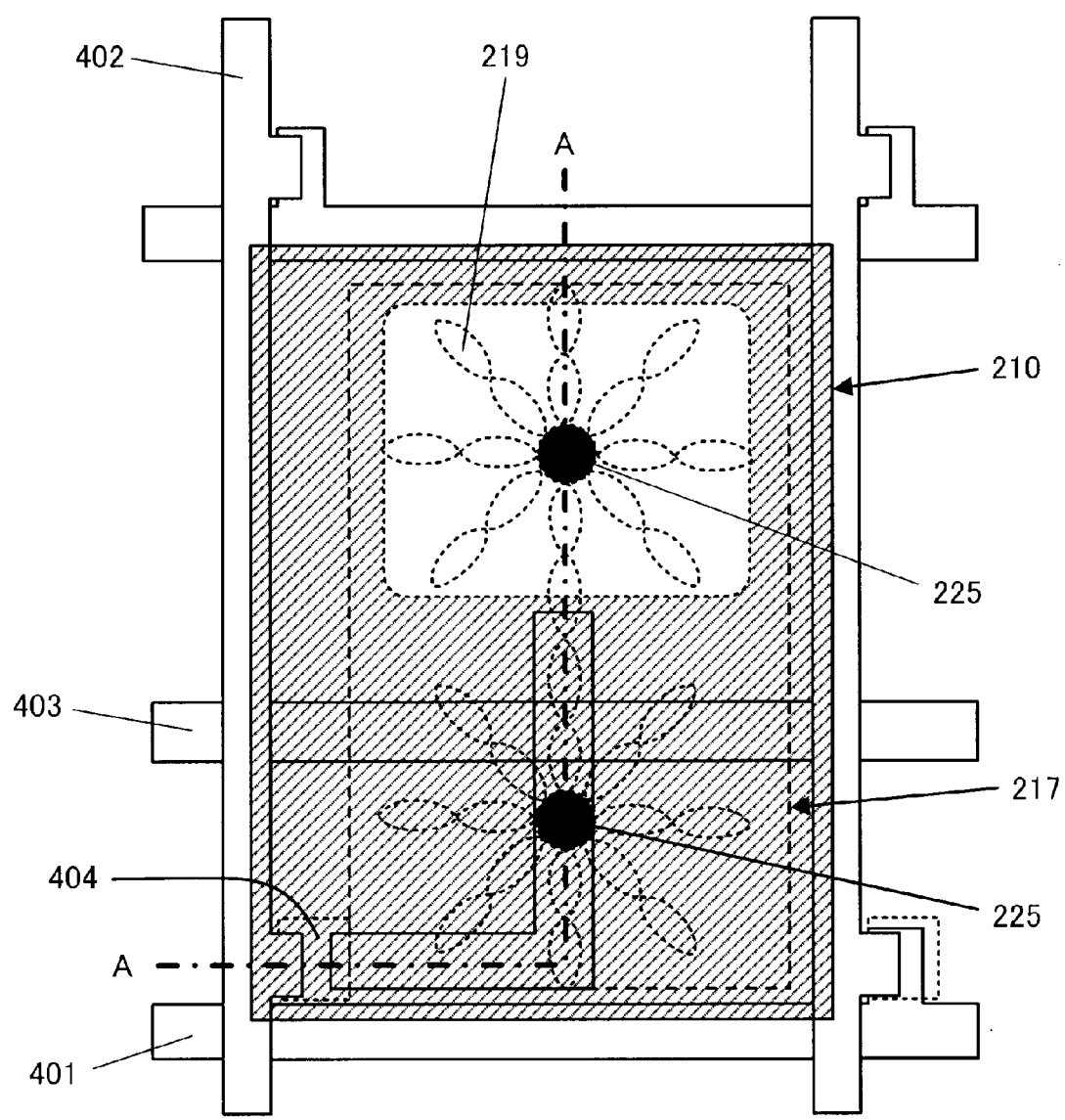
FIG. 3 is a plan diagram showing a pixel region in a liquid crystal display device according to the present invention.

FIG. 1 is a top plan diagram showing one pixel in the liquid crystal display device according to the present embodiment. FIG. 2 is a cross sectional diagram along A-A in FIG. 1. Though FIGS. 1 and 2 show the liquid crystal display device according to the present invention as a semi-transmission type liquid crystal display device of an IPS type, the present invention can be applied to other types of semi-transmission type liquid crystal display devices.

As shown in FIG. 2, the liquid crystal display device according to the present invention is mainly provided with a first substrate 201 and a second substrate 221 which face each other, and a liquid crystal layer 219 sandwiched between the first substrate 201 and the second substrate 221.

First, the process for forming a transmissive region and a reflective region on the first substrate 201 and the structure thereof are described.

In the following description, the processes for forming parts other than the polarizing layer 212 and the protective layer 213 are the same as for well-known semi-transmission type liquid crystal display devices of an IPS type, and therefore, detailed descriptions are omitted.

Switching elements are formed on the transparent substrate used as the first substrate 201.

The switching elements are formed of thin film transistors 111 having a semiconductor layer made of polysilicon, amorphous silicon or an organic substance. In this example, thin film transistors 111 made of polysilicon are described. However, the present invention is not limited to this.

A switching element 105 made of a polysilicon thin film transistor has a gate insulating layer 204, a gate electrode 205, an interlayer insulating layer 206, an electrode layer 207 and a first insulating layer 208 on top of a polysilicon layer which includes a semiconductor layer 203 for providing source/drain regions and a channel region.

A base layer 202 may be provided between the switching element and the first transparent substrate 201 in order to prevent ions from the first transparent substrate 201, such as Na and K, from getting mixed in with the semiconductor layer 203 and the gate insulating layer 204. The base layer 202 has a structure where a layer made of silicon nitride and a layer made of silicon oxide are layered on the first transparent substrate 201 in sequence.

The gate insulating layer 204 and the interlayer insulating layer 206 are made of silicon oxide, for example. The first insulating layer 208 is made of silicon nitride, for example.

Though a metal electrode material may be used for the electrode layer 207, and a film having a three-layer structure where an aluminum layer is sandwiched from top and bottom by titanium (Ti) and tungsten (W) can be used, for example, the present invention is not limited to this.

The electrode layer 207 is connected to the source region and the drain region in the semiconductor layer 203 through openings created in the interlayer insulating film 206.

The thin film transistor 111 is connected to a scan wire 101, a signal wire 102 and a pixel electrode 108.

That is to say, the gate electrode 204 of the switching element 105 is electrically connected to the scan wire 101. In addition, the drain of the switching element 105 is electrically connected to the signal wire 102 via the electrode layer 207 on the drain side through an opening created in a portion of the interlayer insulating layer 206 in the drain region. The source region of the switching element 105 is electrically connected to the pixel electrode 108, 217 via an input/output wire 104 which is in the electrode layer 207 on the source side, through an opening created in a portion of the interlayer insulating film 206 in the source region.

In addition, the first substrate has a common wire 103 and a common electrode 109. The scan wire 101 and the signal wire 102 cross, and the thin film transistor 111 is in the vicinity of where the two cross.

The common wire 103, which is formed on the first substrate 201 together with the thin film transistor 111, is particular to liquid crystal display devices of an IPS type, where a common electrode 109 is formed on the first substrate 201. There is no such reflective display portion including a common wire in semi-transmission type liquid crystal display devices of a TN type of a VA type.

A second insulating layer 209 is provided on top of the switching element. Though this second insulating layer 209 functions to level the surface, which has steps, like switching elements and wires, it may also function to provide unevenness on the below described reflective layer.

It is desirable to use a material which can be applied in a solution when forming a layer in order to level steps. Accordingly, an organic material or inorganic material dispersed in a solvent so that film formation through application is possible can be used for the second insulating layer 209. Furthermore, in the case where a process for making the surface of the second insulating layer 209 uneven is necessary, it is advantageous for the material itself to be photosensitive, because this allows for a simpler process.

In addition, it is desirable for the second insulating layer 209 to be made of a transparent material which absorbs little visible light, in order to allow light from the backlight to pass through efficiently in the transmissive region. Accordingly, it is desirable for the second insulating layer 209 to be made of an organic material, such as photosensitive polyimide or an acryl based resin.

The surface of the second insulating layer 209 may be uneven in the reflective region, so that the surface of the reflective layer is uneven. This unevenness may be created by melting the surface, by raising the temperature after the surface is patterned in accordance with a photolithographic technology, or by using a half-tone mask during the step for exposure to light. Meanwhile, the surface of the second insulating layer 209 is flat in the transmissive region.

A reflective layer 210 which functions as a reflective plate is formed on top of the second insulating layer 209 in a portion corresponding to the reflective region. The reflective layer 210 may be made of a metal material having a high reflectance, such as aluminum or silver, because this allows the layer to have a high reflectance and be formed together with wires. The reflective layer 210 is removed from the transmissive region in accordance with a photolithographic technology. In the case where the surface of the second insulating layer 209 located beneath the reflective layer 210 is uneven, the surface of the reflective layer 210 becomes uneven, reflecting the unevenness created on the surface of the second insulating layer. When the reflective layer 210 is uneven, the angles at which light which enters into the liquid crystal display panel from the outside is reflected from the reflective layer 210 spread, so that the display becomes brighter in actual use. In the case where the reflective layer 210 is also used as a wire, for example as a common wire, such effects are gained that the required process for manufacture can be shortened.

The base layer 211 is provided on top of the reflective layer 210. The base layer 211 functions as a flat layer for preventing the optical performance of the polarizing layer 212 formed above the reflective layer from deteriorating due to the unevenness on the reflective layer 210 in the case where the reflective layer 210 is uneven. That is to say, the base layer functions as a layer for flattening the base on which the polarizing layer 212 is formed. When, a base layer 211 is provided, the optical performance of the polarizing layer 212 can be prevented from deteriorating, and contribute to a brighter image display having a higher contrast ratio.

The base layer 211 is formed of an insulating material, and it is desirable for the material to make layer formation possible through application of a solution, as well as to be transparent and absorb little visible light. That is to say, an organic material, such as a polyimide based resin, an acryl based resin or another commercially available photosensitive polymer material, or an inorganic material dispersed in a solvent so that film formation is possible through application can be used for the base layer, as with the second insulating layer 209.

The polarizing layer 212 is formed above the reflective layer 210 with a base layer 211 in between. The polarizing layer 212 can be formed by applying a solution including C. I. Direct Blue 67, made by Nippon Kayaku Co., Ltd. as a chromonic mesogen, for example. In addition, though solutions including chromonic mesogens having the molecule structure in the following formulas (3) to (20) may be used as the material for forming the polarizing layer, the invention is not limited to this.

(3)

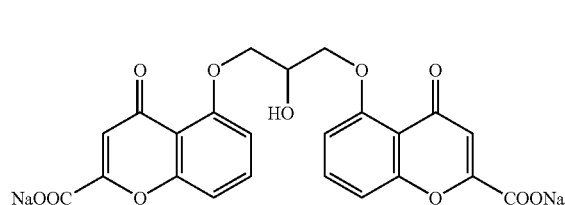

(4)

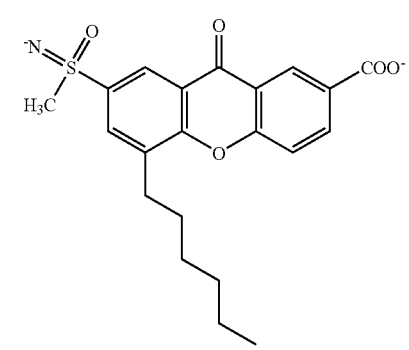

(5)

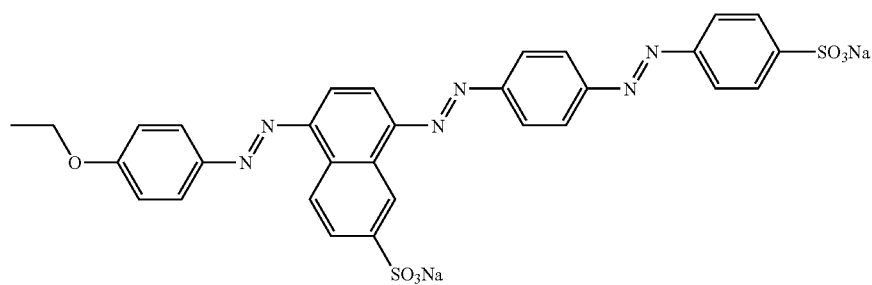

(6)

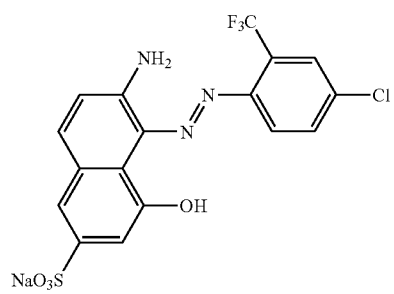

-continued
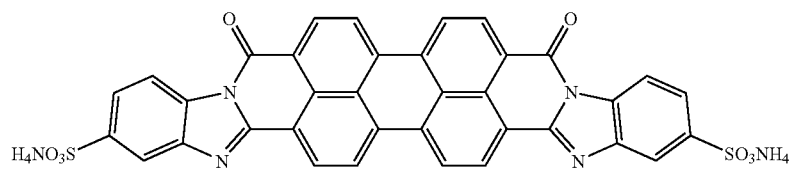
(7)
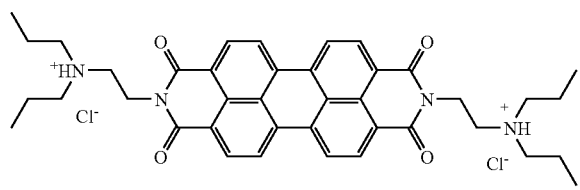
(8)
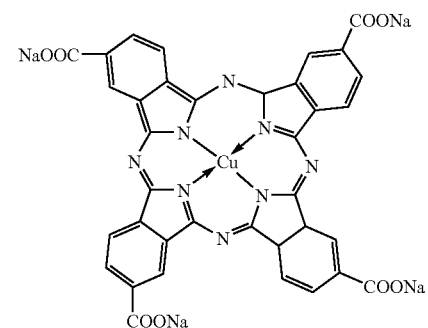
(9)
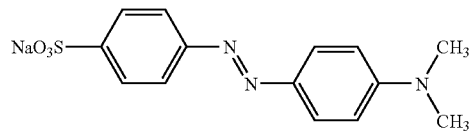
(10)
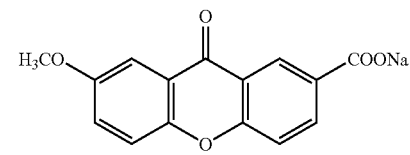
(11)
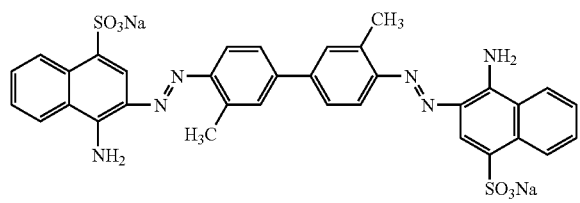
(12)
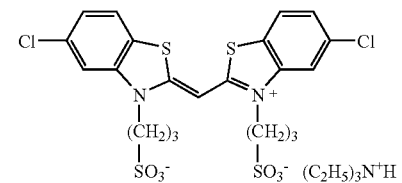
(13)
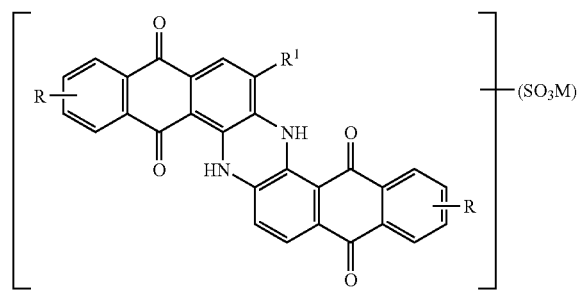
(14)
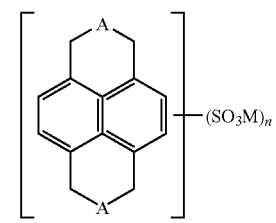
(15)
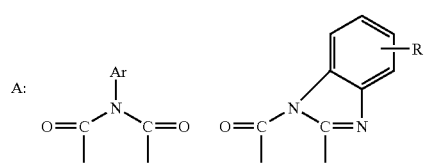

In the formula (14), M is a cation, $R^1$ is H or Cl, R is H, an alkyl group, ArNH or ArCONH, and Ar is a substitute or non-substitute aryl group. In addition, in the formula (15), M is a cation, R is H, an alkyl group, halogen or an alkoxy group, Ar is a substitute or non-substitute aryl group, and n is 2 or 3.

(16)

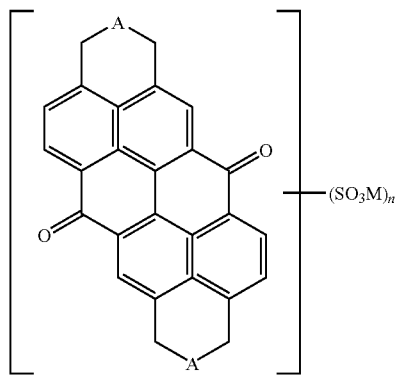

A:

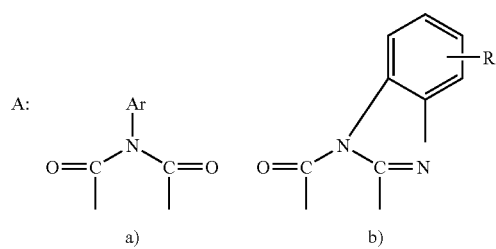

a)     b)

(17)

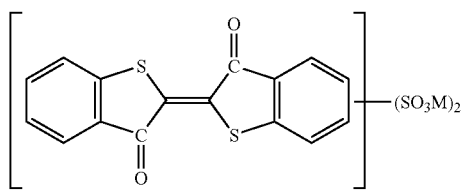

In the formula (16), M is a cation, R is H, an alkyl group, halogen or an alkoxy group, Ar is a substitute or non-substitute aryl group, and n is 2 or 3. In addition, in the formula (17), M is a cation.

(18)

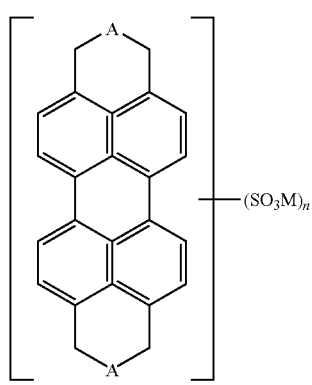

-continued

A:

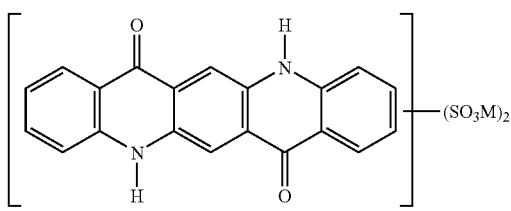

a)     b)

(19)

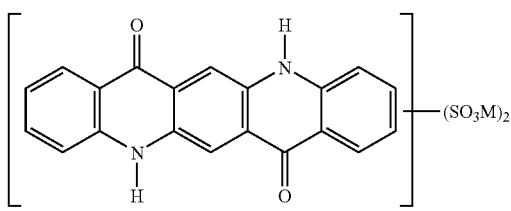

In the formula (18), M is a cation, R is H, an alkyl group, halogen or an alkoxy group, Ar is a substitute or non-substitute aryl group, and n is 2 or 3. In addition, in the formula (19), M is a cation.

(20)

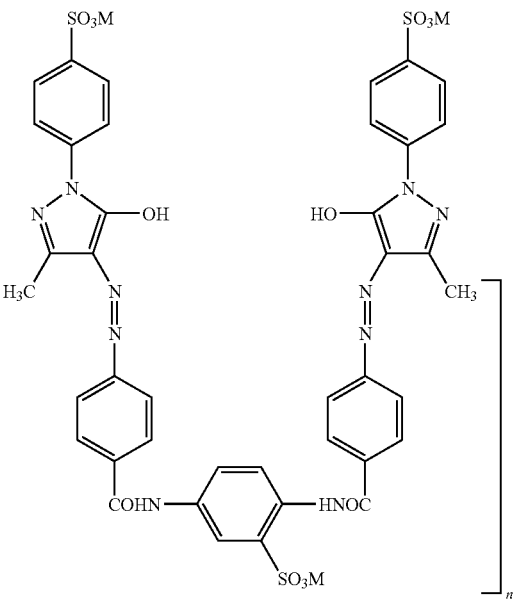

In the formula (20), M is a cation, and n is 3, 4 or 5.

Next, the polarizing layer 212 is applied, and a slit die coater may be used to apply the polarizing layer 212, for example. The slit die coater allows the material for the polarizing layer in a solution to be supplied to a surface and spread in the direction of application with a pressure applied to the material. The die is oriented during this process, and dried and solidified, so that the polarizing layer can be formed.

The polarizing layer 212 is not 100% transparent, and therefore, less light transmits through the polarizing layer, the brightness in the transmissive portion is lower, the contrast ratio in the transmissive portion is affected, and the display quality lowers in the transmissive portion. Therefore, it is desirable for the polarizing layer 212 not to be formed in the transmissive region.

The protective layer 213 is provided in order to prevent the polarizing layer 212 from deteriorating during the process after the formation of the polarizing layer, and in order to prevent impurities from oozing out from the polarizing layer 212 and contaminating other parts in the structure. As the protective layer 213, a material having resistance to oxygen plasma which is transparent to visible light is suitable, and an inorganic material dispersed in a solvent so that film formation through application is possible, or a transparent inorganic material, such as an SOG (spin on glass) material, silicon oxide or silicon nitride, can be used. Particularly in the case where excellent performance is required for the protective layer, silicon nitride, which allows a dense layer to be formed, is desirable.

In the case where the polarizing layer 212 is removed in the transmissive region, the protective layer is patterned in accordance with a photolithographic technology, for example, and the polarizing layer is then irradiated with oxygen plasma using the protective layer as a mask, and thus, the polarizing layer can be removed in the transmissive region. In this case, the polarizing layer can be processed without making contact with a liquid, and therefore, the polarizing layer can be prevented from eluting, and such effects can be gained that high reliability can be secured.

In the case where the precursor of the protective layer 213 is liquid, the material can be applied on the polarizing layer 212, and thus a protective layer can be formed. A slit coater or an inkjet apparatus can be used for the application. In the case of a slit coater, the liquid is applied over the entire surface of the polarizing layer 212. In this case, the protective layer is left only in the region corresponding to the reflective layer 210 in accordance with a well-known photolithographic technology. Though it is desirable for the protective layer 213 to be a film that can be developed in an organic solvent, the invention is not limited to this. In the case of an inkjet application, the protective layer 213 can be applied only in a region corresponding to the reflective layer 210. As a result, a structure where the material for the protective layer 213 is layered on top of the polarizing layer 212 only in a region corresponding to the reflective layer 210 can be gained.

The polarizing layer 212 is irradiated with oxygen plasma using the protective layer 213 as a mask and removed in the transmissive region, and thus, a pattern where the material for the protective layer 213 is layered on the polarizing layer 212 only in a region corresponding to the reflective layer 210 can be gained.

The third insulating layer 214 is formed so as to cover all of the regions. As the third insulating layer 214, a material that is transparent to visible light is suitable, and a transparent resin material, such as a polyimide based resin or an acryl based resin, another commercially available photosensitive polymer material, or a transparent inorganic material, such as silicon oxide or silicon nitride, can be used.

In the case where a first through hole 218 for electrically connecting the common electrode 215 to the reflective layer 210 is created in the base layer 211 in accordance with a photolithographic technology, for example, a transparent photosensitive resist material is used as the resist material, and this resist material is left on top of the protective layer 213 even after the creation of the through hole 218, and thus, may be used as a third insulating layer 214. In this case, such effects can be gained that the number of steps can be reduced.

A common electrode 109, 215 is formed in portions of the reflective region and the transmissive region located above the polarizing layer 212. That is to say, a common electrode 109, 215 is formed in the transmissive region, irrespectively of whether there is a polarizing layer 212.

The common electrode 109, 215 is formed of a transparent conductive material. ITO (indium tin oxide) is suitable for the common electrode 109, 215, for example, and other transparent conductive materials, such as InZnO or ZnO, can also be used. These function to provide a somewhat high conductance, and allow visible light to pass through.

A fourth insulating layer 216 is formed above the common electrode 109, 215, and a pixel electrode 108, 217 is formed on top. As the fourth insulating layer 216, an insulating material which is transparent to visible light is suitable, and a transparent resin material, for example a polyimide based resin or an acryl based resin, another commercially available photosensitive polymer material, or a transparent inorganic material, such as silicon oxide or silicon nitride, can be used.

In the case where a second through hole 106, 224 for electrically connecting the pixel electrode 107, 217 to the thin film transistor 111 is created in accordance with a photolithographic technology, for example, so as to penetrate through the first insulating layer, the second insulating layer, the base layer and the third insulating layer, a transparent photosensitive resist material is used as the resist material, and this resist material is left on top of the common electrode 108, 215 even after the creation of the second through hole 106, 224, and thus, may be used as a fourth insulating layer 216. In this case, such effects can be gained that the number of steps can be reduced.

It is desirable for the pixel electrode 107, 217 to be formed of a transparent conductive material, and ITO (indium tin oxide) is suitable, as with the common electrode 108, 215, and other transparent conductive materials, such as InZnO and ZnO, can also be used. These function to provide a somewhat high conductance, and allow visible light to transmit. In addition, the pixel electrode 107, 217 is connected to the electrode layer 207 that forms a switching element through an opening (second through hole) 106, 224 which penetrates through the fourth insulating layer 216, the third insulating layer 214, the base layer 211, the second insulating layer 209 and the first insulating layer 208. The second through hole 106, 224 is directly filled in with the same conductive material as the pixel electrode. Alternatively, an intermediate layer of a conductive material, not shown, may be provided, in order to ensure electrical connection between the electrode layer 207 and the electrical material that forms the pixel electrode 107, 217.

Here, the common electrode 108, 215 is completely separated from the pixel electrode by creating an opening in a location corresponding to the second through hole 106, 224, so that the common electrode does not make contact with the pixel electrode 107, 217 in the second through hole 106, 224.

In the case where the reflective layer 210 is made of a conductive material, it is completely separated from the pixel electrode by creating an opening in a location corresponding to the second through hole 106, 224, so that the reflective layer does not make contact with the pixel electrode 107, 17 in the second through hole 106, 224.

An orientation film for liquid crystal (not shown) having a polyimide material as a main component is formed on top of the fourth insulating layer 216 and the pixel electrode 107, 217 so as to cover them. It can be formed using flexo printing or a method for forming a film through inkjet application.

As a result, an orientation film for liquid crystal (not shown) is formed on the surface of the substrate.

Next, the second substrate facing the first substrate with the liquid crystal layer 219 in between is described.

A substrate where a color filter layer 220 is formed on top of a transparent substrate 222 is prepared as a facing substrate. The color filter layer 220 has a stripe pattern of red, green blue, and the respective stripes are parallel to signal electrodes (signal wires 102).

An orientation film for liquid crystal (not shown) is formed on the color filter layer 220.

A liquid crystal cell is formed by sandwiching a liquid crystal layer 219 between the first substrate and the second substrate formed as described above.

Outer polarizing plates 222 and 223 are pasted on the two sides of the liquid crystal cell on the outside of the substrates, and combined with a backlight unit (not shown) which becomes the light source, and thus, a liquid crystal display device is provided.

The liquid crystal display device has both a transmissive portion through which light from the backlight transmits and is used for display, and a reflective portion, where external light is reflected from the inside and used for display.

The liquid crystal orientation film (not shown) is close to the liquid crystal layer 219 and determines the orientation thereof.

The pixel electrode 217 and the common electrode 215 are separated by the fourth insulating layer 216. When a voltage is applied, an electrical field is generated between the pixel electrode 217 and the common electrode 215, and the electrical field is distorted to arc form due to the fourth insulating layer 216 and the opening 110 in the transparent conductive film, and passes through the liquid crystal layer. As a result, the orientation changes in the liquid crystal layer 219 when a voltage is applied.

The common wire 103 has such a structure as to protrude into the pixel electrode in a portion where it crosses the pixel electrode 108 and reflects light. In FIGS. 1 and 2, the portion where the common wire overlaps with the pixel electrode is a reflective display portion (reflective region) and the other portion, where the pixel electrode and the common electrode overlap, is a transmissive display portion (transmissive region).

The same liquid crystal display device can be gained in the case where a silicon oxide or silicon nitride film formed through CVD is used as the protective film above the polarizing layer in the above described structure.

When the protective film above the polarizing layer has resistance to oxygen plasma, as described above, the polarizing plate made of chromonic liquid crystal molecules can be dry processed. In addition, the dichroic ratio can be prevented from lowering, and thus, the image quality of the semi-transmission type liquid crystal display device can be improved.

As described above, in the liquid crystal display device according to the first embodiment of the first invention, a reflective layer 210 is formed on the first substrate 201 in the reflective region, a polarizing layer 212 made of chromonic liquid crystal molecules is formed on the first substrate 210 on the liquid crystal layer 219 side of the reflective layer 210, that is to say, in the portion of the first substrate 210 on the upper side of the reflective layer 210, a transmissive pixel electrode 107, 217 that is electrically connected to the electrode 207 of the thin film transistor 111 on the source side is formed on the first substrate 201 on the liquid crystal layer 219 side of the polarizing layer 212, the pixel electrode 107, 217 is formed on the liquid crystal layer 219 side of the transparent common electrode 215, and the common electrode 215 is formed on the liquid crystal layer 219 side of the polarizing layer 212, so that the pixel electrode 107, 217 and the common electrode 215 face each other with the fourth insulating layer 216, which is an insulating film, in between, and a protective layer 213 for protecting the polarizing layer 212 is formed between the polarizing layer 212 and the pixel electrode 107, 217 so as to make contact with the polarizing layer 212, and therefore, the orientation of liquid crystal molecules in the polarizing layer 212 can be prevented from being disturbed as a result of the thermal impact when the common electrode 215, the pixel electrode 217 and the third insulating layer 214 are formed.

As a result, the black-white contrast of the liquid crystal display device, which can be represented as the dichroic ratio, can be prevented from lowering, and thus, high reliability and quality can be achieved in the liquid crystal display device.

In addition, the protective layer 213 is formed of a film having a resistance to oxygen plasma, and thus, the polarizing layer 212 can be used as a mask for patterning in the dry process, and therefore, the polarizing layer 212 can be prevented from eluting. As a result, the dichroic ratio can be prevented from further lowering, and higher reliability and quality can be achieved in the liquid crystal display device.

Second Embodiment

Figure 4:
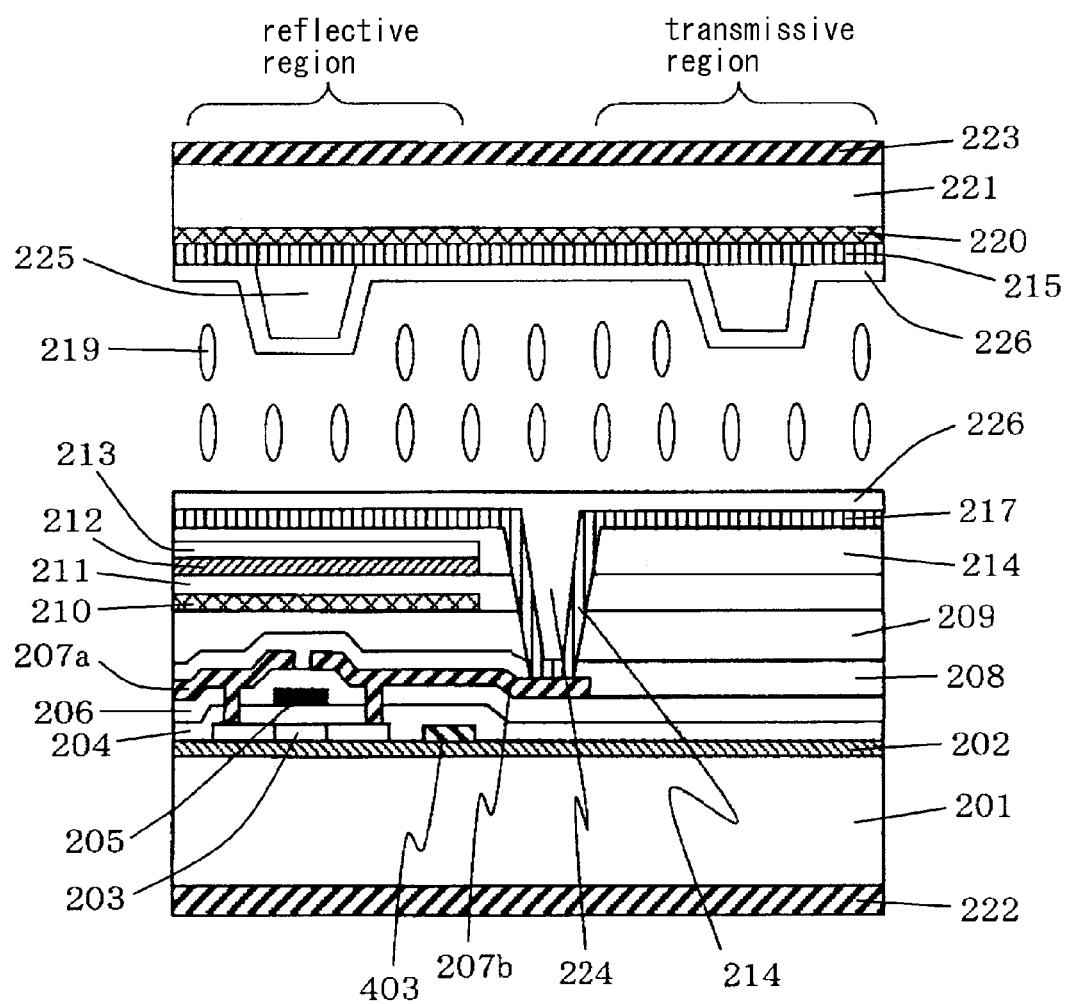
FIG. 4 is a cross sectional diagram showing a pixel region in a liquid crystal display device according to the present invention.

The semi-transmission type liquid crystal display device of a VA type according to the present invention, which is a modification of the above described liquid crystal display device, is described in reference to FIGS. 4 and 5. FIG. 4 is a plan diagram showing the structure of one pixel formed in a semi-transmission type liquid crystal display device of a VA type. FIG. 5 is a cross sectional diagram showing the structure of the pixel (cross section along A-A in FIG. 4).

This semi-transmission type liquid crystal display device is provided with a first substrate 201, a second substrate 221 which faces the first substrate, and a liquid crystal layer 219 which is sandwiched between the two substrates.

The first substrate 201 is provided with a number of parallel gate lines 401, a number of parallel source lines 402 which extend in a direction perpendicular to the gate lines 401, capacitor lines 403 which are provided between the gate lines 401 so as to be parallel to them, TFT's (thin film transistors) 404 which are provided at the intersections between the gate lines 401 and the source lines 402, and pixel electrodes 217 made of transparent electrodes which are provided in display regions surrounded by adjacent gate lines 401 and adjacent source lines 402 so as to correspond to the TFT's 404.

The gate lines 401 and the capacitor lines 403 are provided in the layer between the first substrate 201 and the gate insulating layer 204. These gate lines 401 have gate electrodes 205 which protrude in the direction in which the source lines 402 extend so as to correspond to respective TFT's 404.

A semiconductor layer 203 for forming TFT's 404 is provided in the layer between the gate insulating layer 204 and the first insulating layer 208, and the source lines 402, the source electrodes 207a, which protrude from the source lines 402 in the direction in which the gate lines 401 extend so as to correspond to respective TFT's 404, and drain electrodes 207b, which face the source electrodes 207a, are provided in the layer above the semiconductor layer 3.

Pixel electrodes 217 are provided on the third insulating layer 214.

An orientation film 226 is provided on the pixel electrode 217.

In the first substrate 201, TFT's 404 are formed of a gate electrode 205, a gate insulating layer 204, a semiconductor layer 203, a source electrode 207a and a drain electrode 207b. The reflective layer 210 reflects external light, so that reflected light is used for display, and in addition, is located in the layer above the TFT's 404, and thus works as a light blocking film for blocking external light entering the TFT's 404. As a result, the current can be prevented from leaking due to light entering the TFT's 404.

The second substrate (facing substrate) 221 is a multilayer substrate where a color filter layer 220, a common electrode 215 and an orientation film 226 are layered in sequence. In addition, protrusions 225 are provided in the layer between the common electrode 215 and the orientation film 226 so as to correspond to the reflective layer 210 and pixel electrodes 217.

Here, the protrusions 225 are provided so as to be the center of orientation when a voltage is applied in the respective transmissive portions and reflective portions.

Concretely, only liquid crystal molecules 219 in the vicinity of the protrusions 225 are oriented so as to incline in a radial manner with the protrusions 225 at the center, while liquid crystal molecules at a distance from the protrusions 225 are considered to be oriented practically perpendicular to the surface of the substrate when no voltage is applied to the liquid crystal layer 219. In addition, liquid crystal molecules at a distance from the protrusions 225 are also considered to be oriented so as to incline in a radial manner, as described above, when a voltage is applied to the liquid crystal layer 219. Thus, the orientation of the liquid crystal molecules makes the view angle wide when an image is displayed.

In this semi-transmission type liquid crystal display device, one pixel is formed for each pixel electrode, and each pixel is formed so that a source signal is sent from a source line 402 and a predetermined charge is inputted into the pixel electrode 217 through the source electrode region and the drain electrode region, so that there is a difference in potential between the pixel electrode 217 and the common electrode 215, and a predetermined voltage is applied to the liquid crystal layer 219 when a gate signal is sent from a gate line 401, so that the TFT 404 is in an on state.

In semi-transmission type liquid crystal display devices, liquid crystal molecules in the liquid crystal layer which are oriented so as to be approximately perpendicular to the surface of the substrate are oriented so as to be parallel to the surface of the substrate in a radial manner with the protrusions 225 at the center when a voltage is applied to the liquid crystal layer 219. Thus, the transmittance of light is adjusted using the state of orientation of liquid crystal molecules, which changes in accordance with the applied voltage, and thus, an image is displayed.

Next, the manufacturing method for the semi-transmission type liquid crystal display device according to the present embodiment is described. TFT's 404 are formed on the first substrate 201, as in the above described first embodiment. Here, the present second embodiment provides a semi-transmission type liquid crystal display device of a VA type, and therefore, a common wire 103 and a common electrode 109 are not provided, unlike on the first substrate in the first embodiment.

Next, a reflective layer 210 is formed, as in the first embodiment, and a base layer 202, a polarizing layer 212 and a protective layer 213 are layered on top of the reflective layer 210 in this order. A first insulating layer 208 and a second insulating layer 209 are also formed.

Next, a third insulating layer 214 is formed so as to cover the entire region where the protective layer 213 and the reflective layer 210 are not provided. A material which is transparent to visible light is suitable for the third insulating layer 214, and a transparent resin material, such as a polyimide based resin or an acryl based resin, another commercially available photosensitive polymer material, or a transparent inorganic material, such as silicon oxide or silicon nitride, can be used.

Next, a through hole 224 for connecting the pixel electrode 217 to the drain electrode 207b is created. In the case where the through hole is created in accordance with a photolithographic technology, for example, a transparent photosensitive resist material is used as the resist material, and this resist material is left on top of the protective layer 213 even after the creation of the through hole 224, and may be used as the third insulating layer 214. In this case, such effects are gained that the number of steps can be reduced.

Next, a pixel electrode 217 is formed. It is desirable for the pixel electrode 217 to be formed of a transparent conductive material, and ITO (indium tin oxide), for example, is suitable, but other transparent conductive materials, such as InZnO and ZnO, can also be used. These have a somewhat high conductance and function to transmit visible light. In addition, the pixel electrode 217 is connected to a source electrode 207b which is in the electrode layer for forming a switching element via an opening (second through hole) 224 which penetrates through the third insulating layer 214, the base layer 211, the second insulating layer 209 and the first insulating layer 208. The second through hole 224 is directly filled in with the same conductive material as the pixel electrode 217. Alternatively, an intermediate layer made of a conductive material, not shown, may be provided in order to ensure electrical connection between the electrode material for forming the pixel electrode 217 and the electrode layer 207b.

Next, a liquid crystal orientation film is formed of a polyimide resin, for example, over the entirety of the substrate, over the pixel electrodes 217.

A substrate where a color filter layer 220 is formed on the second substrate 221 is prepared as a facing substrate. An overcoat layer (not shown) is formed in a layer above the color filter layer 220 by applying an acryl resin, for example. Next, an ITO film, for example, is formed on top of the overcoat layer, over the entirety of the substrate, so that a common electrode 215 is formed. It is desirable for the common electrode 215 to be formed of a transparent conductive material, as with the pixel electrode 217.

Next, a photosensitive acryl resin, for example, is applied on the common electrode 215, over the entirety of the substrate, and patterned in accordance with a photolithographic technology so as to correspond to the reflective display portion and the transmissive display portion on the first substrate 201, and thus, protrusions 225 are formed.

Here, holes may be created in the ITO film, in locations corresponding to the protrusions 225, or holes may be created in the pixel electrode 217 on the facing first substrate 201 instead of protrusions 225 on the common electrode 215.

Next, a liquid crystal orientation film 226 is formed of a polyimide resin, for example, on the protrusions 225, over the entirety of the substrate. A liquid crystal cell where a liquid crystal layer 219 is sandwiched between the first substrate and the second substrate formed as described above is formed.

Outer polarizing plates 222 and 223 are pasted on the two sides of the liquid crystal cell on the outside of the substrates and combined with a backlight unit (not shown), which is a light source, and thus, the liquid crystal display device of a VA type as that shown in FIGS. 4 and 5 is completed.

The liquid crystal display device has both a transmissive portion, which allows light from the backlight to transmit and be used for display, and a reflective portion, which allows external light to be reflected from the inside and used for display.

As described above, the liquid crystal display device according to the second embodiment of the present invention is provided with a reflective layer 210 formed in the reflective region on the first substrate 201, a polarizing layer 212 formed on the first substrate 201 on the liquid crystal layer 219 side of the reflective layer 210 from chromonic liquid crystal molecules, a pixel electrode 217 formed on the first substrate 201 on the liquid crystal layer 219 side of the reflective layer 212 and electrically connected to the drain electrode 207b of the thin film transistor (TFT 404), and a protective layer 213 formed between the polarizing layer 212 and the pixel electrode 217 so as to make contact with the above described polarizing layer 212, and therefore, the orientation of the liquid crystal molecules in the polarizing layer 212 can be prevented from being disturbed by the thermal impact when the pixel electrode 217 and the third insulating layer 214 are formed.

As a result, the black-white contrast in the liquid crystal display device, which can be represented as the dichroic ratio, can be prevented from lowering, and thus, high reliability and quality can be achieved in the liquid crystal display device.

In addition, the protective layer 213 is formed of a film having resistance to oxygen plasma, and thus, the polarizing layer 212 can be used as a mask when the pattern is dry processed, and thus, the polarizing layer 212 can be prevented from eluting. As a result, the dichroic ratio can be prevented from further lowering, and higher reliability and image quality can be achieved in the liquid crystal display device.

Several embodiments are described above. Next, concrete examples of the present invention are described. The present invention is not limited to the following examples.

Example 1

First, the effects of the protective layer for the polarizing layer on the resistance of the optical properties of the polarizing layer during processing are described.

Table 1 shows the change in the dichroic ratio when a silicon nitride film formed as a protective film in the layer above the polarizing layer made of chromonic liquid crystal molecules undergoes thermal processing.

First, a solution containing chromonic liquid crystal was applied using a slit coater, and dried and solidified to a polarizing layer. The thickness of the polarizing layer that can be formed as an application film is 215 nm.

Next, a silicon nitride film, which is a protective film in the layer above the polarizing layer, was formed in the following manner.

The silicon nitride film which is a protective film in the layer above the polarizing layer was formed in accordance with a well-known plasma CVD method under such conditions that the temperature for film formation was 200° C. The thickness of the silicon nitride film was 300 nm.

The dichroic ratio is calculated using the following formula after measuring the transmittance of the polarizing layer using a spectrometer where an iodine based polarizing element is provided in an incident optical system.

dichroic ratio($D$)=ln(perpendicular transmittance)/ln(parallel transmittance)

The transmittance when heating for 30 minutes at 200° C. is repeated on top of a hot plate was measured, and the dichroic ratio was calculated.

Comparative Example 1

A polarizing layer was formed through the same process as in Example 1. Next, an acryl based organic film was formed in the layer above the polarizing layer as a protective film through the following process. TPAR, made by Tokyo Ohka Kogyo Co., Ltd., was applied through spin coating in order to form an acryl based organic film, which is the protective film, in the layer above the polarizing layer, and heated at 90° C. for 5 minutes. TPAR is a photosensitive polymer, and therefore, the entire surface was exposed to light, so that the photosensitive agent photodegraded, and then, sintered at 200° C. for 20 minutes, and thus, an acryl based organic film which is a protective film in the layer above the polarizing layer was gained. The thickness of the acryl based organic film was 600 nm.

Next, the transmittance was measured when heated was repeated, as in Example 1, and thus, the dichroic ratio was calculated (see Table 1).

Comparative Example 2

A polarizing layer was formed through the same process as in Example 1. Next, an acryl based organic film was formed in the layer above the polarizing layer as a protective film through the following process. Optmer, made by JSR Corporation, was applied through spin coating in order to form an acryl based organic film, which is the protective film, in the layer above the polarizing layer, and heated at 90° C. for 5 minutes. Optmer is a photosensitive polymer, and therefore, the entire surface was exposed to light, so that the photosensitive agent photodegraded, and then, sintered at 200° C. for 20 minutes, and thus, an acryl based organic film which is a protective film in the layer above the polarizing layer was gained. The thickness of the acryl based organic film was 710 nm.

Next, the transmittance was measured when heated was repeated, as in Example 1, and thus, the dichroic ratio was calculated (see Table 1).

TABLE 1

| material for protective film in upper layer | | number of times heated at 200° C./ dichroic ratio | | | |
|---|---|---|---|---|---|
| | | 1 | 2 | 3 | 4 |
| Example 1 | silicon nitride | 17 | 16 | 16 | 16 |
| Comparative Example 1 | TPAR | 18 | 14 | 12 | 9 |
| Comparative Example 2 | Optmer | 26 | 22 | 18 | 14 |

It is clear from the above that the dichroic ratio did not lower when the heating process was repeated in the case where silicon nitride was used as the protective film in the layer above the polarizing layer, while the dichroic ratio lowered in the case where TPAR or Optmer was used. In order to explain this, Table 2 shows the value of the hardness of the material for the protective film in the layer above the polarizing layer relative to Si wafers.

TABLE 2

| material for protective film in upper layer | hardness relative to Si wafer |
|---|---|
| silicon nitride | 2.16 |
| organic film | 0.03 |

It is clear from the above that silicon nitride has a hardness 70 times higher than organic films, and allows orientation to be secured in the polarizing film made of chromonic liquid crystal without being disturbed by the fluctuation resulting from heat, whereas flexible organic films allow the orientation of the polarizing film to be disturbed by the fluctuation resulting from heat, and the dichroic ratio lowers.

Here, the material and process for forming the protective film in the layer above the polarizing layer are not limited to those in the above described example.

Example 2

The process through which the polarizing layer was patterned using a protective film in an upper layer as a mask is described below.

First, a solution containing chromonic liquid crystal was applied using a slit coater and dried and solidified to a polarizing layer. The thickness of the polarizing layer that could be formed as an application film was 200 nm. A protective film in the layer above the polarizing layer was formed from an SOG material through the following process. OCD type-12 (hydroxy siloxane polymer), made by Tokyo Ohka Kogyo Co., Ltd., was used as the SOG material for the protective film in the layer above the polarizing layer and applied in a desired pattern in accordance with an inkjet method, and then heated on a hot plate of 80° C., 150° C. and 200° C. for 1 minute each, and in addition, sintered for 30 minutes in an oven at 200° C. The thickness of the SOG film was 300 nm.

Next, the polarizing film was etched using oxygen ashing under the below conditions on the protective film in the upper layer and the surface of the polarizing film.

Example of Conditions for Oxygen Ashing
RF output: 800 W
Pressure: 1.0 Torr
Temperature of substrate: 60° C.
Flow of oxygen: 400 sccm
Processing time: 30 min At this time, the SOG film, which is the protective film in the upper layer, has resistance to oxygen plasma, and therefore is not etched, while the polarizing layer made of chromonic liquid crystal is etched, and thus, a desired pattern can be given to the applied SOG.

Next, a solution containing chromonic liquid crystal was applied using a slit coater, and dried and solidified to a polarizing layer. The thickness of the polarizing layer that could be formed as an application film was 250 nm. The dichroic ratio and the contact angle for pure water were calculated and measured, respectively, as in Example 1.

Comparative Example 3

A polarizing layer was formed through the same process as Example 2. Next, an acryl based organic film was formed in the layer above the polarizing layer as a protective film through the following process. TPAR, made by Tokyo Oka Kogyo Co., Ltd., was applied through spin coating in order to form an acryl based organic film, which is the protective film, in the layer above the polarizing layer, and heated at 90° C. for 5 minutes. TPAR is a photosensitive polymer, and therefore, was exposed to light using a desired photomask, and the protective layer in the region that was exposed to light was removed using an alkali liquid, which is a solution of tetramethyl ammonium hydroxide. At this time, though the polarizing layer beneath the protective layer was removed with the alkali liquid, the polarizing layer beneath the protective layer eluted, so that the protective layer lifted and the polarizing layer was also removed.

Comparative Example 4

A polarizing layer was formed through the same process as in Example 2. Next, an acryl based organic film was formed in the layer above the polarizing layer as a protective film through the following process. Optomer, made by JSR Co., Ltd., was applied through spin coating in order to form an acryl based organic film, which is the protective film, in the layer above the polarizing layer, and heated at 90° C. for 5 minutes. Optomer is a photosensitive polymer, and therefore, was exposed to light using a desired photomask, and the protective layer in the region that was exposed to light was removed using an alkali liquid, which is a solution of tetramethyl ammonium hydroxide. At this time, though the polarizing layer beneath the protective layer was removed with the alkali liquid, the polarizing layer beneath the protective layer eluted, so that the protective layer lifted and the polarizing layer was also removed.

It is clear from the above that the polarizing layer elutes, the protective film lifts an the polarizing layer is also removed in the case where the polarizing layer is patterned through wet etching, whereas a desired pattern can be provided in the case where the polarizing layer is patterned through dry etching using a protective film having resistance to oxygen plasma as a mask.

Here, the material and process for forming the protective film in the layer above the polarizing layer are not limited to those in the above described examples.

Example 3

A polarizing layer and a protective film in an upper layer were formed through the same process as Example 1. Next, a resist that can be developed in an organic solvent (acrylate added liquid crystal monomer LC 242, made by BASF Corporation, with photopolymerization initiator added) was applied through spin coating and heated for two minutes on a hot plate at 70° C. in order to gain a resist for patterning the protective film in the upper layer. The resist was exposed to light using a desired photomask, and the resist was developed in PGMEA (propylene glycol monomethyl ether acetate) in the region that was exposed to light, so that a desired pattern was gained. Next, a CF4/O2 based gas was used for etching, and the polarizing film was then etched through oxygen ashing under the below conditions, and at the same time, the resist was removed.

Example of Conditions for Oxygen Ashing
RF output: 800 W
Pressure: 1.0 Torr
Temperature of substrate: 60° C.
Flow of oxygen: 400 sccm
Processing time: 30 min After the resist was removed, the silicon nitride film, which is the protective film in the upper layer, had resistance to oxygen plasma, and therefore was used as a mask to etch the polarizing layer made of chromonic liquid crystal, and a desired pattern could be given to the polarizing layer.

Here, the material for forming the protective film in the layer above the polarizing layer and the process, including patterning, are not limited to those in the above described examples.

What is claimed is:
1. A liquid crystal display device having first and second substrates which face each other with a liquid crystal layer in between, where a transmissive region and a reflective region are formed in each pixel on said first substrate, comprising:
 a reflective layer formed in said reflective region on said first substrate;
 a polarizing layer formed on said first substrate on a liquid crystal layer side of said reflective layer from chromonic liquid crystal molecules;

a pixel electrode formed on said first substrate on the liquid crystal layer side of said reflective layer and electrically connected to a drain electrode of a thin film transistor;

a protective layer formed in the reflective region between said polarizing layer and said pixel electrode, said protective layer being in contact with said polarizing layer;

wherein said protective layer is a film having resistance to oxygen plasma; and wherein ends of both of said protective layer and said polarizing layer are aligned with one another.

2. The liquid crystal display device according to claim 1, further comprising an insulating layer which covers said protective layer and an area larger than an area of said protective layer.

3. The liquid crystal display device according to claim 1, wherein said protective layer has first and second ends, said polarizing layer has first and second ends, said first ends of both of said protective layer and said polarizing layer being aligned with one another so as to lie in a first plane, and said second ends of both of said protective layer and said polarizing layer being aligned with one another so as to lie in a second plane.

4. A liquid crystal display device having first and second substrates which face each other with a liquid crystal layer in between, where a transmissive region and a reflective region are formed in each pixel on said first substrate, comprising:

a reflective layer formed in said reflective region on said first substrate;

a polarizing layer formed on said first substrate on the liquid crystal layer side of said reflective layer from chromonic liquid crystal molecules;

a transmissive pixel electrode formed on said first substrate on the liquid crystal layer side of said reflective layer and electrically connected to a source electrode of said thin film transistor;

a common electrode formed on said first substrate on a liquid crystal layer side of said polarizing layer between said polarizing layer and said pixel electrode;

an insulating film formed between said pixel electrode and said common electrode; and a protective layer for protecting said polarizing layer formed in the reflective region between said polarizing layer and said pixel electrode, said protective layer being in contact with said polarizing layer;

wherein said protective layer is a film having resistance to oxygen plasma; and wherein ends of both of said protective layer and said polarizing layer are aligned with one another.

5. The liquid crystal display device according to claim 4, wherein said protective layer has first and second ends, said polarizing layer has first and second ends, said first ends of both of said protective layer and said polarizing layer being aligned with one another so as to lie in a first plane, and said second ends of both of said protective layer and said polarizing layer being aligned with one another so as to lie in a second plane.

6. A manufacturing method for a liquid crystal display device having a first and second substrate which face each other with a liquid crystal layer in between, where a transmissive region and a reflective region are formed in each pixel on said first substrate, characterized by comprising the steps of:

forming a reflective layer in said reflective region on said first substrate;

forming a polarizing layer on said first substrate on said liquid crystal layer side of said reflective layer;

forming a pixel electrode which is electrically connected to a drain electrode of a thin film transistor on said first substrate on the liquid crystal layer side of said polarizing layer;

forming a protective layer in the reflective region between said polarizing layer and said pixel electrode;

forming said protective layer from a film having resistance to oxygen plasma; and patterning said polarizing layer through a dry process using said protective layer as a mask.

7. A manufacturing method for a liquid crystal display device, having a first and second substrate which face each other with a liquid crystal layer in between, where a transmissive region and a reflective region are formed in each pixel on said first substrate, characterized by comprising the steps of:

forming a reflective layer in said reflective region on said first substrate;

forming a polarizing layer on said first substrate on a liquid crystal layer side of said reflective layer from chromonic liquid crystal molecules;

forming a transmissive pixel electrode that is electrically connected to a drain electrode of a thin film transistor on said first substrate on the liquid crystal layer side of said reflective layer;

forming said pixel electrode, an insulating film and a transmissive common electrode in sequence so that said pixel electrode and said common electrode sandwich the insulating film, said pixel electrode is on a liquid crystal layer side of said common electrode, and said common electrode is on a liquid crystal layer side of said polarizing layer;

forming a protective layer for protecting said polarizing layer in a reflective region between said polarizing layer and said pixel electrode, so that said protective layer makes contact with said polarizing layer;

forming said protective layer from a film having resistance to oxygen plasma; and patterning said polarizing layer through a dry process using said protective layer as a mask.

* * * * *